United States Patent [19]

Liner

[11] Patent Number: 4,795,179
[45] Date of Patent: Jan. 3, 1989

[54] MOVABLE HAIRDRESSING CART

[76] Inventor: Sherry A. M. Liner, 200 Southland Cir., Apt. 208B, Houma, La. 70364

[21] Appl. No.: 94,841

[22] Filed: Sep. 10, 1987

[51] Int. Cl.[4] ............................................. B62B 11/00
[52] U.S. Cl. .................................. 280/47.35; 280/63; 280/79.3; 312/209
[58] Field of Search ................ 280/79.2, 79.1 R, 79.3, 280/47.34, 47.35, 63; 312/209

[56] References Cited

U.S. PATENT DOCUMENTS

| | | | |
|---|---|---|---|
| 580,655 | 4/1897 | Thew | 280/79.3 |
| 1,210,258 | 12/1916 | Babione | 280/79.3 |
| 1,844,698 | 2/1932 | Snyder | 312/209 |
| 1,898,867 | 2/1933 | Brown | 280/79.2 |
| 2,423,292 | 7/1947 | Brown | 280/79.3 |
| 2,584,219 | 2/1952 | Murrell | 280/79.3 |
| 3,506,323 | 4/1970 | Leprince | 312/209 |
| 3,509,831 | 5/1970 | Schnetzer | 108/26 |
| 3,665,867 | 5/1972 | Carlson et al. | 108/25 |
| 3,784,270 | 1/1974 | Delapp | 312/236 |
| 4,329,002 | 5/1982 | Cowen et al. | 312/196 |
| 4,461,504 | 7/1984 | Perez et al. | 280/47.34 |

Primary Examiner—David M. Mitchell
Attorney, Agent, or Firm—Fleit, Jacobson, Cohn & Price

[57] ABSTRACT

A movable cart is rolled by the operator to the location where a client is sitting. The cart is made of plastic material and is sufficiently light to be easily transported across a floor. All the supplies necessary for providing permanent-type hair care are readily available to the operator. A permanent is thereby given in a short time period, avoiding the fuss and confusion normally associated with obtaining a permanent.

7 Claims, 2 Drawing Sheets

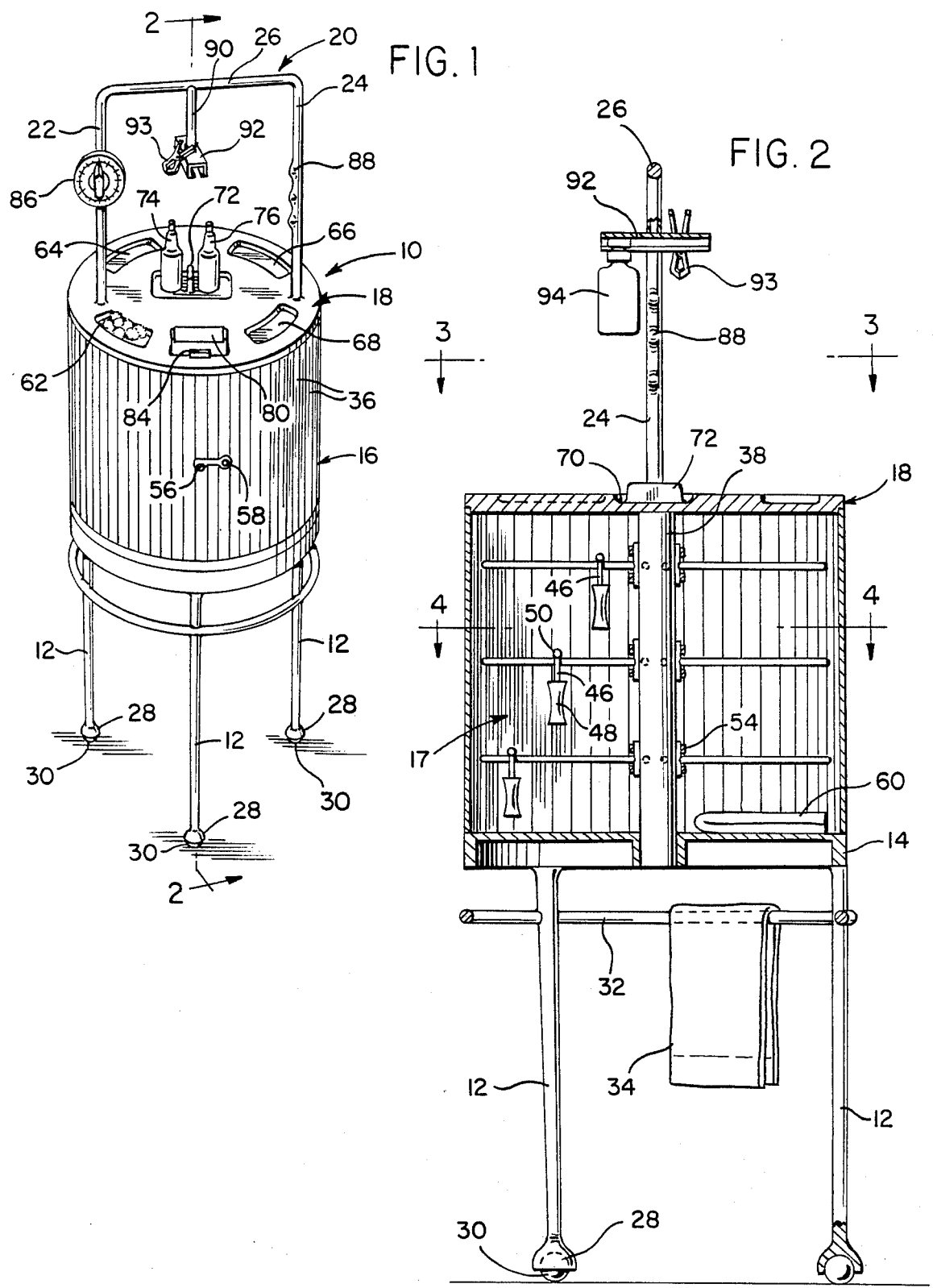

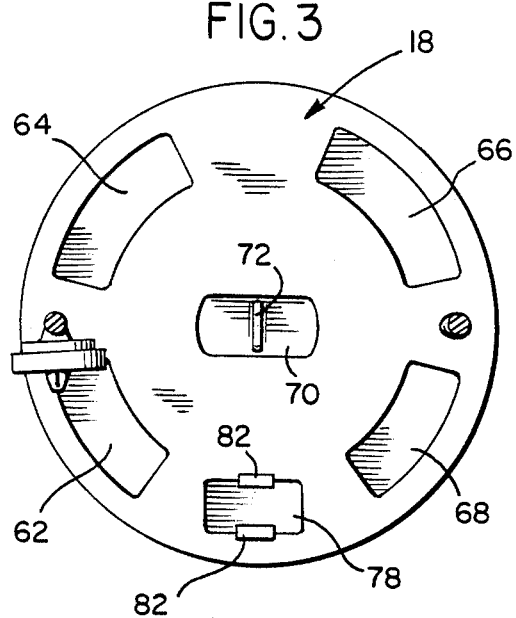
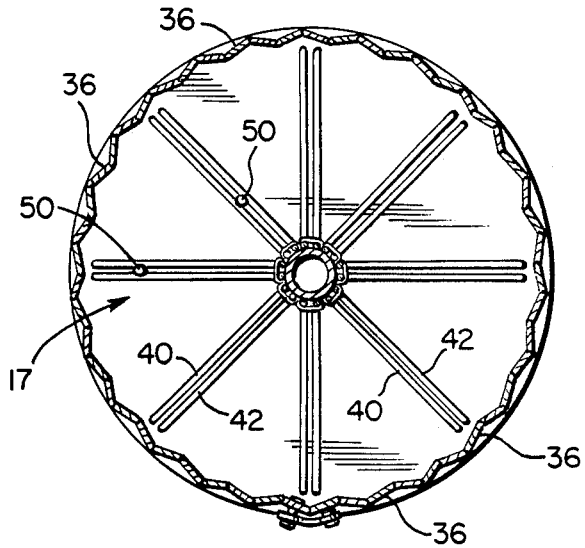
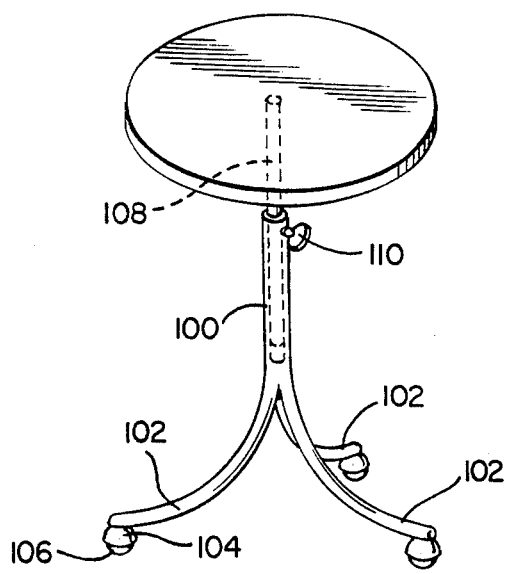
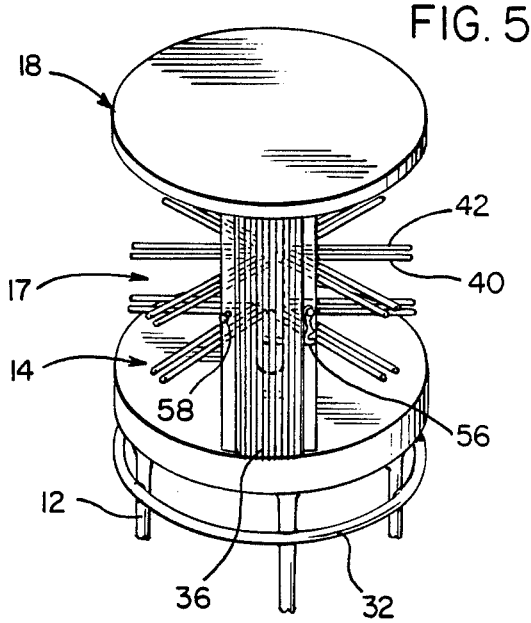
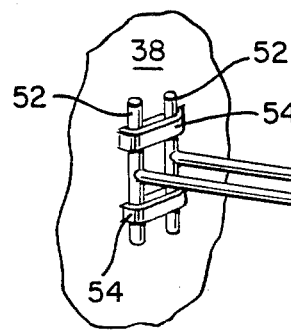
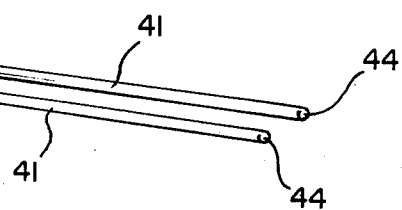

MOVABLE HAIRDRESSING CART

BACKGROUND OF THE INVENTION

Present practice for the setting of hair in a permanent wave ("perm") involves the use of many pieces of different equipment. The operator normally travels to different areas of a shop to locate the materials necessary to complete a perm, while the client anxiously awaits the conclusion of the procedure. This procedure is time-consuming for the operator and nerve-wracking for the client.

SUMMARY OF THE PRESENT INVENTION

By the present invention, a movable cart is rolled by the operator to the location where a client is sitting. The cart is made of plastic material and is sufficiently light to be easily transported across a floor. All the supplies necessary for providing a permanent are readily available to the operator. A permanent is thereby given in a much shorter time period, avoiding the fuss and confusion normally associated with obtaining a permanent.

Perm rods and end paper in a handy dispenser are readily accessible from the cart. A sixty-minute timer with bell alarm is mounted on the cart and provides accurate timing of the procedure. All other accessories are readily available from a labeled top shelf of the cart. A water bottle is hung on the cart within an arm's length reach of the operator. A hand-grip rail provides a reliable grip for movement of the cart on its wheels. An accordian style cover keeps the perm rods hidden from sight when they are not in use and also acts as a dry sanitizer for protecting tee perm rods from exposure to the elements.

It is an object of the present invention to provide a hairdressing cart having a base shelf, a top shelf, a central Post interconnecting the base shelf and the top shelf, wheels for supporting the base shelf and for providing mobility to the cart, a plurality of sets of perm rod storage prongs radially projecting from the center post, and a cover located between the top shelf and the bottom shelf and surrounding the central post and the storage prongs for providing a protected storage area between the top shelf and the bottom shelf.

It is another object of the present invention to provide a hairdressing cart for containing all the supplies necessary for providing permanent-type hair care.

It is yet another object of the present invention to provide a hairdressing cart providing storage for perm rods, end papers, a timer, cotton, plastic caps, clips, picks, combs, a perm solution bottle, and a neutralizer solution bottle.

These and other objects of the invention, as well as many of the intended advantages thereof, will become more readily apparent when reference is made to the following description, taken in conjunction with the accompanying drawings.

BRIEF DESCRIPTION OF THE DRAWINGS

FIG. 1 is a perspective view of a movable hairdressing cart.

FIG. 2 is a side sectional view taken along line 2—2 of FIG. 1.

FIG. 3 is a plan sectional view taken along line 3—3 of FIG. 2.

FIG. 4 is a plan sectional view taken along line 4—4 of FIG. 2.

FIG. 5 is a partial view of the cart shown in FIG. 1 with an accordian-type cover in an open position.

FIG. 6 is a detailed view of the perm rod holder shown in FIGS. 2, 4, and 5.

FIG. 7 is a perspective view of an alternate base for the cart shown in FIG. 1.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific terms includes all technical equivalents which operate in a similar manner to accomplish a similar purpose.

With reference to the drawings, in general, and to FIGS. 1 through 6 in particular, a movable hairdressing cart embodying the teachings of the subject invention is generally designated as 10. With reference to FIG. 1, the cart 10 includes three legs 1 supporting a base shelf 14. An accordian-type cover 16 is mounted above the base shelf an below a top shelf 18. The cover 16 surrounds a cabinet 17 for storage of perm rods. Projecting from the top shelf 18 is U-shaped bar 20, which includes legs 22 and 24 interconnected by cross-piece 26.

At the base of each leg 12 is a castor assembly 28 including ball-shape roller 30. The castor assembly provides for ease of movement of the cart in any desired direction. In FIG. 2, a towel 34 is shown draped over the towel bar 32 which interconnects legs 12.

The cover 16 is made up of a series of vertically extending slats 36 which form the accordian-type cover for a perm rod storage area. The cover is used as a dry sanitizer to keep the perm rods sterile. The slats slide on a track or groove on the underside of the top shelf and the top side of the base shelf.

As shown in FIGS. 2, 4, and 5, the interior of the cover 16 includes a central post 38 from which sets of perm rod storage prongs 40 and 42 project in a radial direction. Prongs 40 and 42 are mounted on center post 38 at three different levels and form vertical rows between adjacent levels. The diameter and height of the center post 38 between the bottom shelf 4 and top shelf 18 determines how many radially projecting prongs are present. Preferably, there will be three levels of prongs.

The radial length of the sets of prongs is sufficient to hold between 20 and 25 perm rods. The prongs are of a rigid material, with a smooth surface so that the perm rods can easily slide in or out. The free ends 44 of the prongs are smooth to prevent damage to the perm rods when sliding the perm rods between a set of prongs. The prongs may be coated with TEFLON TM so that the perm rods will slide easily on the prongs.

The spacing between two prongs of one set is sufficient so that the band 46 of the perm rod 48 does not touch the sides of the prongs. Therefore, the size of head 50 of the perm rod is immaterial, as long as the heads 50 rest upon the prongs so as to support the band 46 and perm rod 48.

The perm rods are removed from the prongs by grabbing the lower part of the perm rod while wrapping the hair of a client for a perm. This avoids the tangling of perm bands 46, which has been a problem in the past. The perm rods are hung from the prongs individually and can be arranged in groups of similar size and color, similar to the way in which they are sold.

The prongs 40 and 42 are T-shaped at their ends opposite to free ends 44. Elongated rod portions 41 extend perpendicular to rods 52. Rods 52 are mounted on center post 38 by brackets 54.

The slats 36 of the accordian-type cover 16 are compressed together in FIG. 5, to provide access to the sets of prongs 40, 42. A hasp 56 is secured to a pin 58, as shown in FIG. 1, to secure the cover 16 in a closed or open condition. As shown in FIG. 5, the top of base shelf 14 is used as a storage area for small items such as for towel 60.

Five indentations for perm accessories are provided on top of top shelf 18. At the base of each indentation is a label to aid in placing the proper accessory in a specific location. As shown in FIGS. 1 and 3, indentation 62 is for storage of cotton. Indentation 64 is for storage of plastic caps. Indentation 66 is for clips and picks, while indentation 68 is for combs Indentation 70 is divided by partition 72 to separate a perm solution bottle 74 from a neutralizer solution bottle 76. At a location between indentation 62 and 68 is an area 78 for holding an automatic end paper dispenser 80 by clips 82. The paper dispenser includes a refill lid to gain access to the interior of the paper dispenser for placement of additional end papers. When an end paper 84 is pulled out from the side of the dispenser, another end paper is exposed.

Projecting from the top shelf 18 is U-shaped bar 20. Leg 22 includes a sixty-minute timer 86, which includes a bell alarm. The timer may be set to ring after any period of time between one and sixty minutes. On leg 24 is a hand grip 88 for holding onto the cart to move the cart by its castor assembly 28. Suspended from the cross-piece 26 is an extension bar 90 which terminates in an elongated C-section bar 92. The bar 92 is shaped like a C to facilitate the sliding in and out of the cap of a water bottle 94, to hold the water bottle, or any other desired bottle, in place out of the way but readily obtainable. A clothespin 93 is attached to the side of bar 92 to secure gloves in position above the cart.

In FIG. 7, an alternate base assembly is illustrated for the cart of FIG. 1. A tubular post 100 branches into three legs 102, which include castor assembly 104 with roller 106. A tube 108 extends downwardly from bottom shelf 14. Tube 108 is of a smaller outer diameter than the inner diameter of tube 100. Tube 108 is slidably mounted within tube 100 and is locked at a desired position by turn screw 110. By the loosening and tightening of screw 110, the height of the bottom shelf 14, and therefore of the top shelf 18, is adjustable.

By the present invention, all the materials for providing a permanent are readily accessible. Further, the cart which includes the materials is mounted on rollers for ease of movability. In addition, the cart organizes all the required materials for giving a permanent, while protecting the perm rods in an enclosed cabinet.

Having described the invention, many modifications thereto will become apparent to those skilled in the art to which it pertains without deviation from the spirit of the invention as defined by the scope of the appended claims.

I claim:

1. A hairdressing cart comprising:
   a base shelf,
   a top shelf,
   a central post interconnecting said base shelf and said top shelf,
   wheel means for supporting said base shelf and for providing mobility to the cart,
   a plurality of sets of perm rod storage prongs radially projecting from said central post and located between said base shelf and said top shelf, the perm rod storage prongs of each set of perm rod storage prongs being spaced from each other to avoid contacting a band of a perm rod while supporting a head of the perm rod, and
   cover means located between said top shelf and said bottom shelf and surrounding said central post and said perm rod storage prongs for providing a protected storage area between said top shelf and said bottom shelf.

2. A cart as in claim 1, wherein said cover means includes a plurality of vertical slats which are movable between an open and a closed position.

3. A cart as in claim 1, wherein said top shelf includes a plurality of indentations for holding of various materials necessary to provide permanent-type hair care.

4. A cart as in claim 1, wherein a U-shaped bar is mounted on said top shelf, said bar including two legs and a cross-piece interconnecting said two legs.

5. A cart as in claim 4, wherein an elongated C-shaped bar is mounted on said cross-piece.

6. A cart as in claim 4, wherein a timer is mounted on one leg.

7. A cart as in claim 4, wherein a hand grip is mounted on one leg.

* * * * *